(12) United States Patent
Jameson et al.

(10) Patent No.: US 8,867,678 B2
(45) Date of Patent: Oct. 21, 2014

(54) INTERFERENCE CHANNEL EQUALIZER

(71) Applicant: L-3 Communications Corp., New York, NY (US)

(72) Inventors: Teren G. Jameson, Taylorsville, UT (US); Scott N. Adamson, Bountiful, UT (US); Osama S. Haddadin, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 106 days.

(21) Appl. No.: 13/628,753

(22) Filed: Sep. 27, 2012

(65) Prior Publication Data

US 2014/0086300 A1    Mar. 27, 2014

(51) Int. Cl.
| | |
|---|---|
| H03D 1/06 | (2006.01) |
| H03D 11/04 | (2006.01) |
| H03K 5/01 | (2006.01) |
| H03K 6/04 | (2006.01) |
| H04L 1/00 | (2006.01) |
| H04L 25/08 | (2006.01) |

(52) U.S. Cl.
USPC .......................................... 375/348; 370/208

(58) Field of Classification Search
CPC ..... H04B 1/1081; H04B 7/0613; H04B 15/04
USPC .......................................... 375/348; 370/208
See application file for complete search history.

(56) References Cited

U.S. PATENT DOCUMENTS

| | | | |
|---|---|---|---|
| 8,724,685 B2 * | 5/2014 | Ki et al. ........................ | 375/229 |
| 2002/0191535 A1 * | 12/2002 | Sugiyama et al. ............ | 370/208 |
| 2003/0035491 A1 * | 2/2003 | Walton et al. ................. | 375/267 |
| 2005/0084044 A1 * | 4/2005 | Kokkonen ..................... | 375/347 |
| 2005/0254461 A1 * | 11/2005 | Shin et al. ..................... | 370/329 |

* cited by examiner

*Primary Examiner* — Sam K Ahn
*Assistant Examiner* — Fabricio R Murillo Garcia
(74) *Attorney, Agent, or Firm* — Husch Blackwell LLP; Robert Bowman

(57) ABSTRACT

An interference channel equalizer for receiving and processing at least two distinct RF data signals transmitted over the same frequency to a single receiving station that has at least one receiver for each distinct transmitted RF data signal. Each receiver processes an RF data signal received by its antenna and outputs an output data signal which corresponds to one of the distinct transmitted RF data signals. Each receiver includes an antenna configured to receive an RF data signal, a demodulator, a delay block to selectively delay the received RF data signal, an interference cancellation feed forward filter that uses the received signal from another receiver to remove co-channel due to another distinct RF transmitted data signal from the signal being processed, and a decision feedback equalizer to mitigate both intersymbol and multipath interference from the received signal being processed.

12 Claims, 3 Drawing Sheets

INTERFERENCE CHANNEL EQUALIZER

CROSS-REFERENCE TO RELATED APPLICATIONS

None.

BACKGROUND OF THE INVENTION

As wireless data transmission continues to grow in popularity and become more widespread, the number of users is ever increasing. The frequency ranges at which data may be transmitted is currently fixed by regulatory agencies. Thus, the airwaves are becoming more congested due to great increases in the popularity of mobile computing devices and phones and the related data transmission. Alternatively, certain users may have a particular frequency reserved for data communication for its customers and/or its own use, but the number of users and the amount of data transferred over this frequency is likewise increasing.

Thus, in order to supply the demand for increases in the number of users of a wireless data network and the amount of data transmission within the limited bandwidths provided by regulatory agencies, the industry must develop hardware and methods that are able to receive separate signals in the same frequency range and separate the signals so that successful radio frequency ("RF") data transfer may be experienced. This application has proved very difficult because the fact that each data signal is transmitted at the same frequency and this introduces new challenges in filtering and signal separation that are not present due to signal interference experienced with data signals sent over different frequencies. If co-channel interference cannot be mitigated, then neither data signal may be decoded and used by the intended recipient. Thus, a reliable method of separating co-channel interference is desired or else the number of users on a given network may not expand to match demand, and network capacity, performance and/or other regulatory based limitations on the growth of the mobile data transfer and computing markets may result.

In these situations, when at least two users in separate physical locations each transmit a data signal over the same frequency to one central data receiving station, co-channel interference is introduced into the system which must be mitigated in order to use the data being transmitted in each transmitted signal. In addition, the receiver station and signal receivers must also mitigate and address inter-symbol and multi-path interference that are typical and present in most single channel wireless RF data transmission. Accordingly, in situations where multiple users transmit digital data signals to a single receiving station, then co-channel, inter-symbol, and multi-path interference must be addressed and successfully mitigated in order for the receiving users to decode and use transmitted data signals.

Thus, there is a substantial need in the art for a combined signal processing device and method that can separate the transmitted signals and eliminate co-channel, inter-symbol, and multipath interference multipath when at least two signals are transmitted to a single receiver station. There is a further need in the art for such a combined signal processing device and method that can separate the transmitted signals and eliminate co-channel, inter-symbol, and multipath interference that also strengthens the received data signals through a diversity gain.

SUMMARY OF THE INVENTION

The present invention is directed toward an interference channel equalizer that combines co-channel interference cancellation and channel equalization in order to process multiple data signals transmitted from multiple users over the same frequency to a single receiving station wherein the receiving station includes a receiver to process and output each transmitted signal. The interference channel equalizer fixes the problems introduced by the environment and removes distortion due to inter-symbol, co-channel and multipath interference so that the intended recipients may receive and use the data as transmitted. The interference channel equalizer comprises at least two receivers in electronic communication wherein each receiver is configured to receive, process, and output a data signal transmitted by a corresponding transmitting user.

Each receiver may include an antenna that is configured to receive an RF data signal. The antenna is in electronic communication with a demodulator that converts the received RF data signal and provides an output data signal that may be manipulated and refined by a series of downstream filters. The receiver further includes a delay block in electronic communication with the demodulator and the delay block is configured to receive an output data signal from the demodulator. The receiver further includes an interference cancellation feed forward ("ICFF") filter. ICFF filter may be a finite impulse response filter. The ICFF filter receives a data signal from the demodulator of at least one other receiver. The maximum filter length of ICFF filter is determined by the maximum delay that the transmitted signals experience between antennas.

The delay block is configured to selectively delay the output data signal to coordinate the combination of the data signal output from the delay block with the data signal output from the ICFF filter. The delay block selectively delays the received data signal output in order to place the delay block output data signal in the window of the output data signal of the ICFF filter to most effectively cancel any co-channel interference present in the received data signal caused by the other signals being received at that single receiving location. The combination of the output signal of the delay block and the ICFF filter additionally provides a diversity gain to strengthen the combined output data signal being processed and ultimately output by that receiver.

The combined data signal is received as input into a decision feedback equalizer ("DFE"). The DFE comprises a channel equalizer feed forward filter, a decision device, and a channel equalizer feedback filter. The data signal loops within the DFE such that the output of the channel equalizer feed forward filter is input into the decision device, the output of the decision device is received as input into the channel equalizer feedback filter, and the output of the channel equalizer feedback filter is combined with the output of the channel equalizer feed forward filter. The data signal resulting from the combination of the outputs of the feed forward filter and the feedback filter is split and sent to at least three operators. First, the combined signal is re-introduced into the DFE for further processing. Second, the combined signal of the channel equalizer feed forward and feedback filters is combined with the output of the decision device resulting in an error signal. The error signal is processed through known algorithms or operators to determine the filter coefficients for the feed forward and feedback filters of the interference channel equalizer. The DFE is configured to optimize performance by minimizing the error signal, i.e. close to zero. Third, the combined signal of the channel equalizer feed forward and feedback filters is also the output of the interference channel equalizer of the present invention then goes through error correction operations and subsequently routed and delivered to the end user.

Each receiver of interference channel equalizer is similarly configured to process and output a single data signal transmitted by a remote user over the same frequency as the other transmitted signals.

Other aspects and advantages of the present invention will be apparent from the following detailed description of the preferred embodiments and the accompanying drawing figures.

BRIEF DESCRIPTION OF THE SEVERAL VIEWS OF THE DRAWING

The accompanying drawings form a part of the specification and are to be read in conjunction therewith, in which like reference numerals are employed to indicate like or similar parts in the various views, and wherein.

DETAILED DESCRIPTION OF THE INVENTION

The following detailed description of the invention references the accompanying drawing figures that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and, therefore, the description is not to be taken in a limiting sense and shall not limit the scope of equivalents to which such claims are entitled.

Figure 1:
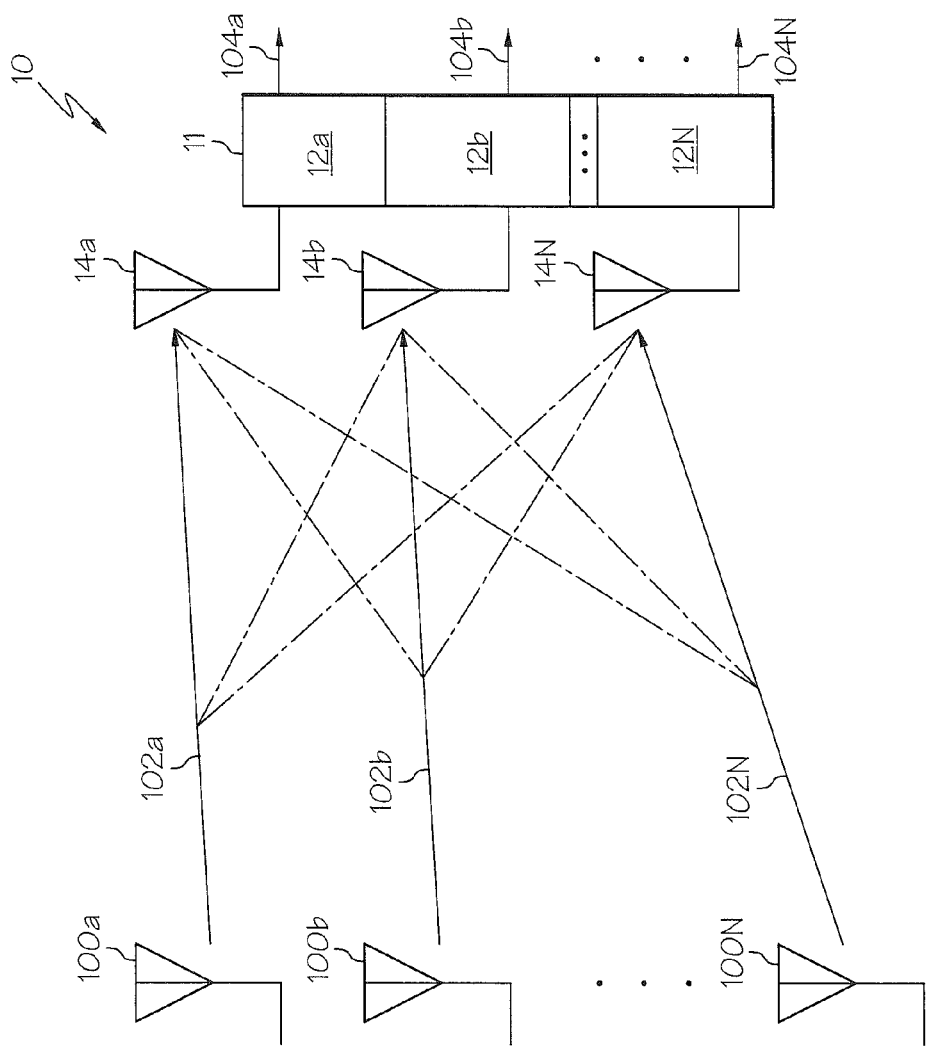
FIG. 1 is a schematic view of a transmission system that includes one embodiment of the interference channel equalizer in accordance with the teachings of the present invention.

As illustrated in FIG. 1, the present invention is directed toward an interference channel equalizer 10 that combines co-channel interference cancellation and channel equalization in processing multiple data signals transmitted from multiple users over the same frequency to a single user. FIG. 1 generally illustrates the transmission system in which the interference channel equalizer 10 of the present invention would be inserted to filter and process transmitted data signals. Interference cancellation equalizer 10 removes distortion due to inter-symbol, co-channel, and multipath interference in the transmitted RF signals so that they may be decoded and used by the intended recipient users. As this is a joint demodulation and interference cancellation system, each path attempts to improve the signal-to-noise-plus-interference ratio ("SNIR") of its own signal. For an embodiment with two data signals sent over the same frequency and for a first data path, the desired signal is that of the first user and the goal is to improve reception of that signal by reducing the interference from the signal present on a second path. For the second data path, the desired signal is that from the second user and the goal is to improve reception of that signal by reducing the interference from the signal present on the first path.

In an embodiment of RF data signal transmission system illustrated in FIG. 1, a first user operates a first transmitter 100a to transmit a first user data signal 102a, a second user uses a second transmitter 100b to transmit a second user data signal 102b, and an "N"$^{th}$ user operates an "N"$^{th}$ transmitter 100N to transmit an "N"$^{th}$ data signal 102N wherein transmitted RF data signals 102a through 102N are transmitted over the same frequency range. First transmitter 100a, second transmitter 100b, and up to an "N"$^{th}$ transmitter 100N are in distinct locations and send user data signal 102a, and 102b through 102N to a single terminal 11. The transmitters 100a-100N may be stationary land based systems, or may include multiple mobile users, either on land or in the air, transmitting to a single base station.

Terminal 11 is in electronic communication with a first antenna 14a, a second antenna 14b, and through and an "N"$^{th}$ antenna 14N, wherein there is at least one antenna per transmitted signal as shown. As further shown, antennas 14a through 14N also receive one or more interfering data signals 102a through 102N due to the overlap of signal propagation. Terminal 11 comprises distinct signal receivers 12a through 12N, wherein each receiver 12a through 12N is in electronic communication with a respective antenna 14a through 14N and receivers 12a through 12N provide both co-channel interference cancellation and channel equalization on the received data signal to output one of the transmitted data signals 104a through 104N. Receivers 12a through 12N remove distortion due to inter-symbol, co-channel and multipath interference in the transmitted RF signals so that they may be decoded and used by the intended recipient users. Thus, at each receiver 12a through 12N, all except one data signal must be cancelled out and other interference removed in order to output the corresponding output data signals 104a through 104N to the recipient users.

Figure 2:
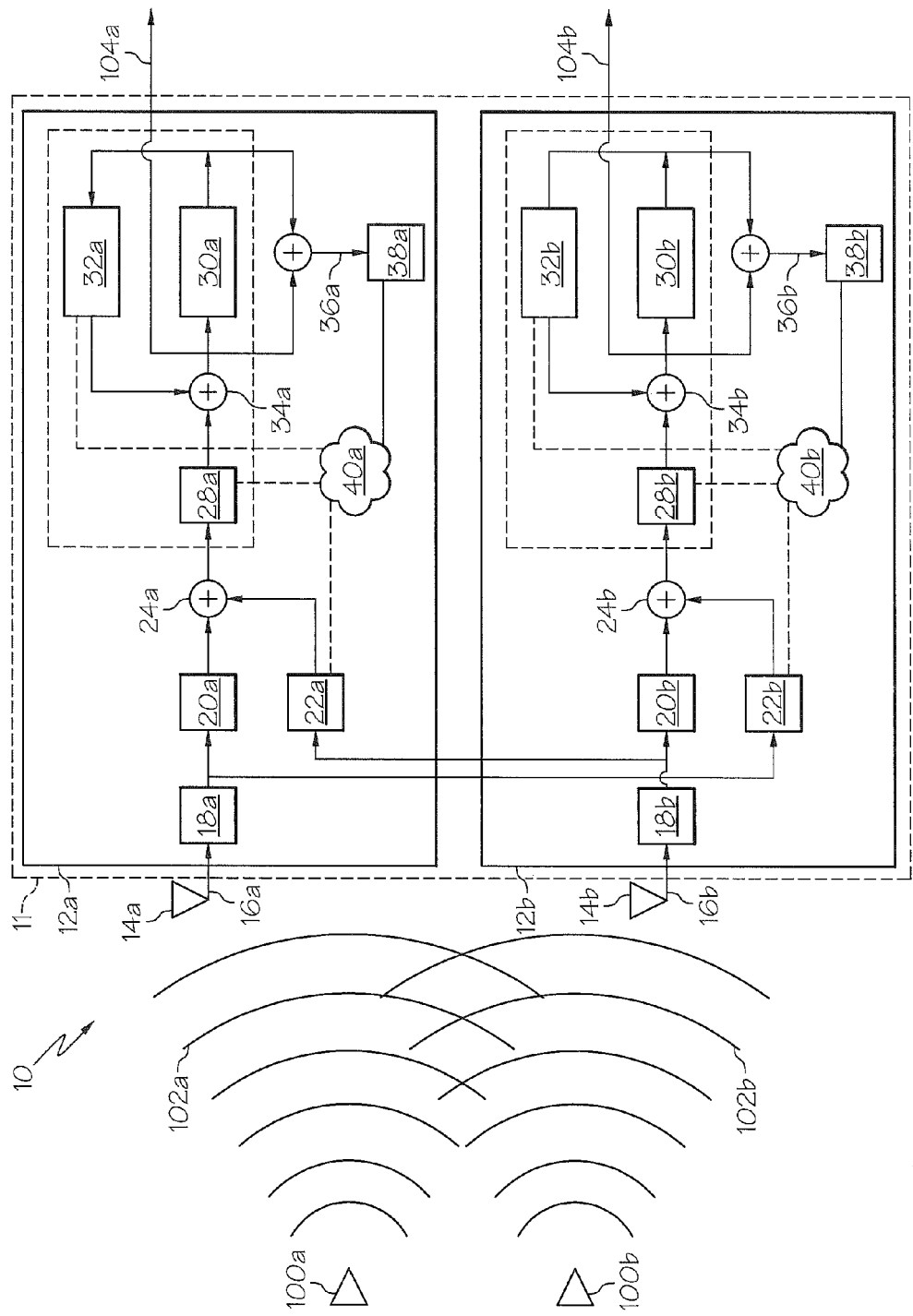
FIG. 2 is a schematic view of one embodiment of the interference channel equalizer in accordance with the teachings of the present invention.

FIG. 2 illustrates an embodiment of interference channel equalizer 10 that comprises at least two receivers 12a and 12b in electronic communication with each other and each receiver 12a, 12b is configured to receive, process, and output the data signal from a corresponding user. This description focuses upon an embodiment of FIG. 2 including two receivers 12a and 12b for clarity and to simplify the description; however, a person of skill in the art will appreciate that embodiments of interference channel equalizer 10 may be expanded to include more than two receivers as shown in FIG. 1, wherein each receiver is configured to receive and process RF data signals originating from a distinct transmitting user sent over the same frequency.

FIG. 2 illustrates the two receivers 12a and 12b shown in greater detail. Each includes an antenna 14a and 14b that is configured to receive an RF data signal 16. Antenna 14 may be any RF antenna or data receiver now known or hereafter developed. As further illustrated in FIG. 3 and generally applicable to each receiver 12 of interference channel equalizer 10, antenna 14 is in electronic communication with a demodulator 18 wherein demodulator 18 converts the received RF data signal 16 and provides an output data signal that may further be manipulated and refined by the downstream filters of interference channel equalizer 10. Demodulator 18 may perform one or more of the following actions: carrier recovery, timing recovery, bit slip, pulse compression, carrier phase and frequency recovery, re-sampling (sample rate change i.e. decimation or interpolation), symbol and chip matched filtering (instead of pulse compression) or other function now known or hereafter developed. Demodulator 18 may be any demodulator now known or hereafter developed.

Figure 3:
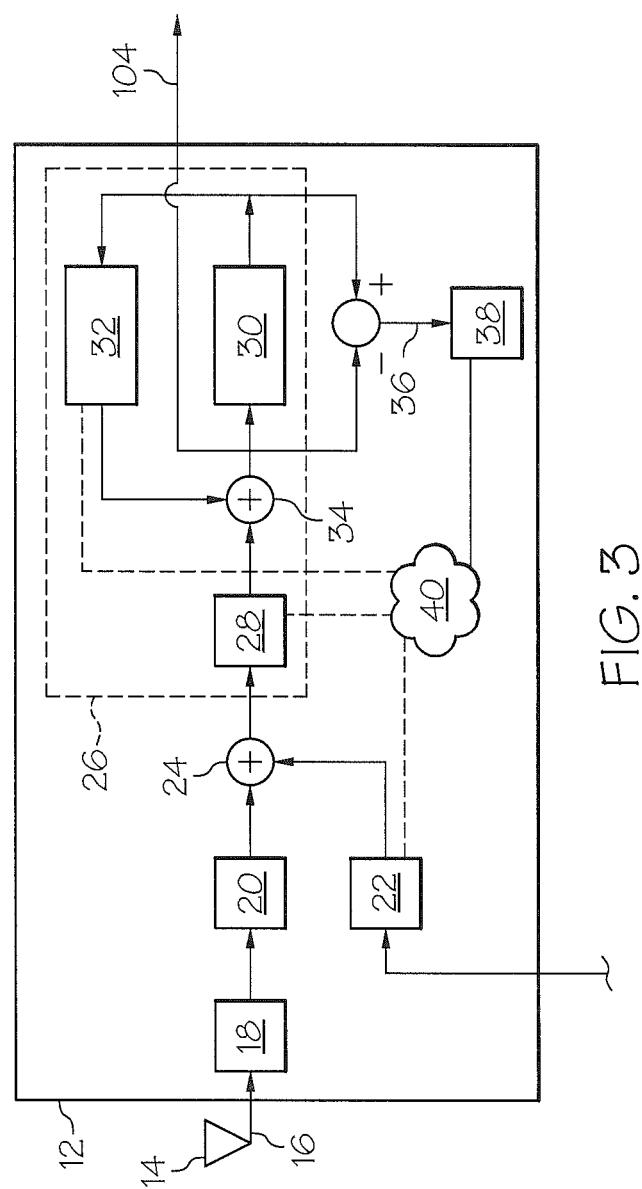
FIG. 3 is a schematic view of one receiver of the embodiment of the interference channel equalizer of FIG. 2.

As shown in FIG. 3, receiver 12 includes a delay block 20 in electronic communication with demodulator 18 that is configured to receive the data signal output by demodulator 18. Receiver 12 further includes an interference cancellation feed forward ("ICFF") filter 22. ICFF filter 22 is configured to remove co-channel interference caused by at least one other transmitted data signal received by a central receiving station. ICFF filter 22 may be a finite impulse response filter. ICFF filter 22 receives a data signal from the demodulator 18 of another receiver, and as shown in FIG. 2, ICFF filter 22a receives the signal from demodulator 18b of receiver 12b. The maximum filter length of ICFF filter 22 may be determined by the maximum delay difference a transmitted signal experiences when it is received by two separate antennas. The length ICFF filter 22 may also be impacted by inter-symbol interference. The coefficients for the impulse response of ICFF filter 22 will vary and the ICFF filter 22 is adaptive in that the coefficients of the impulse response of the ICFF filter 22 are variable and constantly updated due to variations in the location and position of the transmitters and/or the receivers, the signal strength, and the noise level in the interfering signal, or other relevant conditions. The coefficients of ICFF filter 22 may be determined by optimizing an error signal and updated in real-time or at pre-determined time intervals. This embodiment would be particularly useful, for example, if the transmitter and/or the receivers are in an airplane or other vehicle that is travelling and not in any one fixed location during transmission or receipt of the RF data signal.

Turning back to FIG. 3, delay block 20 is configured to selectively delay the output data signal to coordinate the combination of the output of delay block 20 with the data signal output by ICFF filter 22 at interference cancellation signal combination point 24. Delay block 20 selectively delays the data signal output in order to place the delay block output data signal in the window of the output data signal of ICFF filter 22 to most effectively cancel any co-channel interference present in the output signals. Delay block 20 can be configured dynamically using calculations made in the system wherein the peak of the cross-correlation between the two received data signals give the delay value needed for delay block 20. The combination of the output signal of delay block 20 and ICFF filter 22 at combination point 24 additionally provides a diversity gain to strengthen the combined output data signal being processed and ultimately output by interference channel equalizer 10.

As further shown in FIG. 3, once the outputs from delay block 20 and ICFF filter 22 have been combined, the signal then enters a decision feedback equalizer ("DFE") 26. DFE comprises a channel equalizer feed forward filter 28, a decision device 30, and a channel equalizer feedback filter 32 in electrical communication as shown. Channel equalizer feed forward filter 28 may be either a finite impulse response filter or infinite impulse response filter configured to remove inter-symbol interference and multi-path interference when the multi-path delay is relatively small. Channel equalizer feedback filter 32 may be either an infinite response filter or finite response filter configured to remove inter-symbol interference from the current signal caused by the previously received signal and multi-path interference when the multi-path delay is longer than can be removed with channel equalizer feed forward filter 28. DFE 26 further includes an equalizer signal combination point 34 wherein output data signals from channel equalizer feed forward filter 28 and channel equalizer feedback filter 32 are combined and added together. Decision device 30 operates on the output signal to generate the most likely decisions. A training sequence may be embedded in the transmitted data and be used instead of the live data as a mechanism to improve performance.

The combined signal from equalizing combination point 34 also is sent to error combination point 36 wherein the signal from equalizing combination point 34 is subtracted from the output data signal from decision device 30 as shown in FIG. 3. This combination results in an error signal 38. Algorithm processor 40 is in communication with filters 22, 28, and 32 to adapt the filter coefficients. Further, after the data signals are combined at equalizing combination point 34, the signal is also sent out to the end user in an output signal 104 that is subjected to error correction, routing, and delivery to its intended recipients using any protocol or method now known or hereafter developed.

In use and as shown in FIG. 2, interference cancellation equalizer 10 is inserted into an RF data signal between the transmission of the signal and the signal being routed to the end user. A user operates a first transmitter 100a to transmit a first user data signal 102a and another user uses a second transmitter 100b to transmit a second user data signal 102b wherein transmitted RF data signals 102a and 102b are transmitted over the same frequency range. First and second transmitters 100 may be any RF data transmitter now known or hereafter developed. First transmitter 100a and second transmitter 100b are in two distinct positions and send data signal 102a and 102b to one single location that includes a first receiver 12a and a second receiver 12b.

A first receiver 12a is designated to receive first user data signal 102a. Thus, a first received data signal 16a is received by a first antenna 14a of first receiver 12a. Because first user data signal 102a and second user data signal 102b travel in the same frequency range, first received data signal 16a will comprise both first user data signal 102a and second user data signal 102b. In embodiments of the present invention including more than two receivers to process more than two RF data signals over the same frequency, each receiver will likely receive a portion of the other signals as shown due to overlap of signal propagation. As further shown in FIG. 2, a second receiver 12b is designated to receive second user data signal 102b. Thus, a second received data signal 16b is received by a second antenna 14b of second receiver 12b. Likewise, because first user data signal 102a and second user data signal 102b travel in the same frequency range, second received data signal 16b comprises both second user data signal 102b and first user data signal 102a. Both received signals 16a and 16b will also likely include one or more of inter-symbol interference or multi-path interference often experienced from the transmission of a data signal over any network that negatively affects the quality of the received data signals 16a and 16b.

Receivers 12a and 12b of interference cancellation equalizer 10 each output an output data signal 104a and 104b. First receiver 12a outputs a first output data signal 104a corresponding first user data signal 102a and second receiver 12b outputs second output data signal 104b corresponding to second user data signal 102b. To most clearly describe how first output data signal 104a is achieved by being processed by receiver 12a, the path of first received data signal 16a through receiver 12a will be fully explained. FIG. 2 illustrates an embodiment of interference cancellation equalizer 10 and, as disclosed above, antenna 14a of first receiver 12a receives first received data signal 16a. First antenna 14a is in electronic communication with a first demodulator 18a and first received data signal 16a is demodulated by first demodulator 18a which converts the received RF signal and included data packets into a manipulatable continuous digital data signal. Demodulator 18a is in electronic communication with delay block 20a and first received data signal 16a is thereafter received as input into delay block 20a. For purposes of this description, the term "electronic communication" shall mean connected by communication between elements wherein an electronic data signal is communicated through one or more wires, a circuit, wireless communication, or any other method now known or hereafter developed in the art.

At the same time, antenna 14b of second receiver 12b receives second received data signal 16b. Antenna 14b is in electronic communication with a second demodulator 18b and second received data signal 16b is demodulated by demodulator 18b thereby converting the received RF signal and included data packets into a manipulatable continuous digital data signal 16b. The output of demodulator 18b is in electronic communication with first ICFF filter 22a. Second received data signal 16b is split and is input into first ICFF filter 22a. One embodiment of the ICFF filter 22 incorporates (2*n+1) taps (where n equals the worst case delay); however, a person of skill in the art may use any number of taps to obtain the desired filtering effect.

The output of delay block 20a and ICFF filter 22a is combined in an additive manner at interference cancellation signal combination point 24a in order to remove co-channel interference due to antenna 14a simultaneously receiving second user data signal 102b. Delay block 20a is used to compensate for the worst case delay, in samples, between antennas 14a and 14b when using the same frequency, and to place the interfering signal (the second user data signal 102b) in the window of the ICFF filter 22a for cancellation of the co-channel interference. In one embodiment, first user data signal 102a arrives at antenna 14a of receiver 12a as the desired signal at the maximum delay time before first user data signal 102a arrives at antenna 14b of receiver 12b as the interfering signal, delay block 20a delays its output so that the first tap of the ICFF filter 22a will cancel the interference in first received data signal 16a caused by second user data signal 102b. Conversely, if first user data signal 102a arrives at antenna 14b of receiver 12b as the interfering signal at the maximum delay time before first user data signal 102a arrives at antenna 14a of receiver 12a as the desired signal, then delay block 20a will delay its output so that the first tap of ICFF filter 22a will cancel the interference in first received data signal 16a caused by second user data signal 102b. The combination of the outputs of delay block 20a and ICFF filter 22a also provides a diversity gain, thereby increasing the amplitude of first user data signal 102a compared to the other interference in first received data signal 16a thereby improving the signal-to-noise-plus-interference ratio (SNIR) for that data path.

After combining the outputs of delay block 20a and ICFF filter 22a at signal combination point 24a, first received data signal 16a is input into DFE 26a. First received data signal 16a is received as input into channel equalizer feed forward filter 28a. Channel equalizer feed forward filter 28a is configured to remove inter-symbol interference and multi-path interference when the multipath delay is relatively small in first received data signal 16a. First received data signal 16a is then combined with the output of channel equalizer feedback filter 32a as shown in FIG. 2.

The combined data signal from channel equalization point 34a is received by decision device 30a and decision device 30a attempts to estimate the actual transmitted data signal of the data signal based upon the input signal. Decision device 30a outputs the estimated data signal comprised of each individual postulated data signal. The data signal output by decision device 30a is received by channel equalizer feedback filter 32a and the coefficients of channel equalizer feedback filter 32a are configured to remove inter-symbol interference in the signal 16a caused by the previously received signal. The output signal of channel equalizer feedback filter 32a is then looped back around and combined with the output signal of channel equalizer feed forward filter 28a at channel equalization point 34a thereby removing the inter-symbol interference from the current signal caused by the same, but previously received data from the same source. The combined signal then re-enters the decision device 30a which can then be recycled through the DFE to better postulate the actual transmitted signal.

The combined signal from 34a is also output from DFE 26a and combined with the output of the decision device 30a to result in an error signal 38a. Error signal 38a comprises the difference between the signal entering decision device 30a and the postulated signal exiting decision device 30a. The goal of the loop of DFE 26a is to minimize the error signal 38a such that the output signal of decision device 30a substantially matches the input signal of the decision device 30a. Further, the error signal may be run through any algorithm processor 40 known in the art or hereafter developed to determine the filter coefficients for ICFF filter 22, channel equalizer feed forward filter 28 and/or channel equalizer feedback filter 32. Algorithm processor 40a is in communication with filters 22, 28, and 32 and configured to be able to adjust the filter coefficients. The ability of interference channel equalizer 10 to alter the coefficients of the above filters provides the adaption necessary to minimize the error signal and more effectively filter all types interference introduced in the transmission, receiving, or other steps. The adaptive quality of interference channel equalizer 10 also allows it to change the coefficient for any changes in interference based upon changing topography, electrical fields, or other intermediate interference source during the transmission of an RF data signal.

The combined data signal from equalizing data point 34a is also output from interference channel equalizer 10 as output data signal 104a for error correction and/or coding to be routed and delivered to the end user using any data routing and delivery now known or hereafter developed.

Similarly to first receiver 12a and as further shown in FIG. 2, second receiver 12b is designated to receive second user data signal 102b. Antenna 14b of second receiver 12b receives second received data signal 16b. Second output data signal 104b is similarly obtained as first output signal 104a described above, as second received data signal 16b is processed by receiver 12b. Second antenna 14b is in electronic communication with second demodulator 18b and second received data signal 16b is demodulated by second demodulator 18b which converts the received RF signal and included data packets into a manipulatable continuous digital data signal 16b. Demodulator 18b is in electronic communication with delay block 20b and first received data signal 16b is received as an input into delay block 20b.

The output of demodulator 18a of first receiver 12a is in electronic communication with second ICFF filter 22b as shown in FIG. 2. First received data signal 16a is split and is received as an input into second ICFF filter 22b. The outputs of delay block 20b and ICFF filter 22b are combined in an additive manner at interference cancellation signal combination point 24b.

Delay block 20b is used to compensate for the worst case delay, in samples, between antennas 14a and 14b when using the same frequency, and to place the interfering signal (the first user data signal 102a) in the window of the ICFF filter 22b for cancellation of the co-channel interference. In one embodiment, second user data signal 102b arrives at antenna 14b of second receiver 12b as the desired signal at the maximum delay time before first user data signal 102b arrives at antenna 14a of receiver 12a as the interfering signal, then delay block 20b delays its output so that the first tap of ICFF filter 22b will cancel the interference in second received data signal 16b caused by first user data signal 102a. Conversely, if second user data signal 102b arrives at antenna 14a of first receiver 12a as the interfering signal at the maximum delay time before second user data signal 102b arrives at antenna 14b of receiver 12b as the desired signal, then delay block 20b will delay its output so that the first tap of ICFF filter 22b will cancel the interference in second received data signal 16b caused by first user data signal 102a. The combination of the outputs of delay block 20b and ICFF filter 22b also provides a diversity gain, increasing the amplitude of second user data signal 102b compared to the other interference present in second received data signal 16b.

After combining the outputs of delay block 20b and ICFF filter 22b at signal combination point 24b, second received data signal 16b is input into DFE 26b. DFE 26b will process second received data signal 16b in the same manner as DFE 26a processes first received data signal 16a as described above. Accordingly, the combined signal from equalizing data point 34b is also output from DFE 26b of interference channel equalizer 10 as output data signal 104b for error correction and/or coding to thereby be routed and delivered to the end user using any data routing and delivery now known or hereafter developed.

As is evident from the foregoing description, certain aspects of the present invention are not limited to the particular details of the examples illustrated herein. It is therefore contemplated that other modifications and applications using other similar and related features and techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

We claim:

1. An interference channel equalizer for receiving and processing a plurality of radio frequency ("RF") data signals transmitted over the same frequency comprising:
   a single terminal having a plurality of antennas for receiving a plurality of RF data signals and a plurality of receivers, each receiver in electronic communication with at least one antenna and in electronic communication with at least one other of the plurality of receivers;
   at least a first receiver for receiving and processing a first RF data signal and a second receiver for receiving and processing a second RF data signal, said first receiver being in electronic communication with at least said second receiver, and said second receiver being in electronic communication with at least said first receiver;
   said first receiver comprising a first adaptive interference cancellation filter for receiving and filtering at least said second RF data signal from said second RF receiver, wherein the filtered at least said second RF data signal is combined with said first RF data signal to cancel co-channel interference due to at least said second RF data signal from said first RF data signal and thereby create a first combined RF data signal;
   said second receiver comprising a second adaptive interference cancellation filter for receiving and filtering at least said first RF data signal from said first RF receiver, wherein the filtered at least said first RF data signal is combined with said second RF data signal to cancel co-channel interference due to at least said first RF data signal from said second RF data signal and thereby create a second combined RF data signal;
   said first receiver further comprising a first adaptive decision feedback equalizer downstream of said first adaptive interference cancellation filter for cancelling one of intersymbol and multipath interference in said first combined RF data signal; and
   said second receiver further comprising a second adaptive decision feedback equalizer downstream of said second adaptive interference cancellation filter for cancelling one of intersymbol and multipath interference in said second combined RF data signal.

2. The interference channel equalizer of claim 1 wherein said terminal comprises at least a first antenna in electronic communication with a first receiver and a second antenna in electronic communication with a second receiver, said first antenna receives said first received RF data signal and said second antenna receives a said second received RF data signal.

3. The interference channel equalizer of claim 2 wherein the first received data signal includes at least a first transmitted data signal and a second transmitted data signal, and wherein the second received data signal includes at least the first transmitted data signal and the second transmitted data signal.

4. The interference channel equalizer of claim 3 wherein the first interference cancellation filter is in electronic communication with the second receiver, and the second interference cancellation filter is in electronic communication with the first receiver for communicating the first received data signal to the second interference cancellation filter and the second received data signal to the first interference cancellation filter.

5. The interference channel equalizer of claim 1 wherein said first decision feedback equalizer outputs a first output data signal.

6. The interference channel equalizer of claim 5 wherein first output data signal corresponds to the first transmitted data signal.

7. The interference channel equalizer of claim 1 wherein the RF data signal received by each receiver is processed substantially simultaneously.

8. An interference channel equalizer for receiving and processing a plurality of radio frequency ("RF") data transmissions over the same frequency at a single receiving station comprising:
   at least two receivers for processing one of a plurality of distinct transmitted RF data signals, each of said receivers comprising an antenna configured to receive an RF data signal, a demodulator in electric communication with said antenna, a delay block in electronic communication with said demodulator, an interference cancellation feed forward filter, a decision feedback equalizer downstream of said delay block and interference cancellation feed forward filter, said decision feedback equalizer in electronic communication with both said delay block and said interference cancellation feed forward filter, wherein each receiver processes an RF data signal received by an antenna and outputs an output data signal which corresponds to one of the plurality of RF data transmissions;
   wherein said interference cancellation feed forward filters of each of the at least two receivers are in direct electronic communication with a demodulator of another one of the at least two receivers, and wherein a second data signal received by a second antenna of a second of said at least two receivers is input into a first interference cancellation feed forward filter of a first of said at least two receivers; and
   wherein said first receiver combines a first received data signal received by a first antenna of said first receiver, said first received data signal being demodulated by a first demodulator of said first receiver and selectively delayed and output by a first delay block of said first receiver, with the filtered second data signal output by said first interference cancellation feed forward filter of said first receiver thereby mitigating co-channel interference in said first received data signal due to said second received data signal and providing a diversity gain with respect to said first received data signal;

wherein the combined signal is input into a first decision feedback equalizer of said first receiver, said first decision feedback equalizer being configured to remove inter-symbol and multipath interference from said received data signal; and wherein said first decision feedback equalizer outputs said first output data signal which corresponds to a first transmitted data signal.

9. A method for filtering a distinct transmitted radio frequency ("RF") data signal from a plurality of distinct transmitted RF data signals transmitted over the same frequency to a single receiving terminal having at least one antenna for each distinct RF data transmission, the method comprising:

receiving a first received RF data signal at a first antenna;

receiving a second received RF data signal at a second antenna;

filtering said first received RF data signal in a second interference cancellation feed forward filter of a second receiver;

filtering said second received RF data signal in a first interference cancellation feed forward filter of a first receiver;

combining said first received RF data signal with said filtered second received data signal output by said first interference cancellation feed forward filter to remove co-channel interference due to said second received RF data signal from said first received RF data signal and thereby providing a diversity gain;

combining said second received RF data signal with said filtered first received data signal output by said second interference cancellation feed forward filter to remove co-channel interference due to said first received RF data signal from said second received RF data signal and provide a diversity gain;

processing said combined first received RF data signal and said filtered second received data signal in a first decision feedback equalizer of the first receiver to cancel intersymbol and multipath interference present in said combined first received RF data signal and said filtered second received data signal;

processing said combined second received RF data signal and said filtered first received data signal in a second decision feedback equalizer to cancel intersymbol and multipath interference present in said combined second received RF data signal and said filtered first received data signal;

outputting said processed first received RF data signal to wherein said processed first received RF data signal corresponds to a first transmitted data signal; and outputting said processed second received RF data signal wherein said processed second received RF data signal corresponds to a second transmitted data signal.

10. The method of claim 9 further comprising demodulating the first received RF data signal and the second received RF data signal prior to said filtering steps.

11. The method of claim 9 further comprising delaying the first received RF data signal in a first delay block of the first receiver so as to output the first received RF data signal in a window of the filtered second received RF data signal output by the first interference cancellation feed forward filter.

12. The method of claim 9 further comprising delaying the second received RF data signal in a second delay block so as to output the second received RF data signal in a window of the filtered first received RF data signal output by the second interference cancellation feed forward filter.

* * * * *